United States Patent
Utsumi et al.

(10) Patent No.: US 9,386,169 B2
(45) Date of Patent: Jul. 5, 2016

(54) IMAGE FORMING APPARATUS THAT PERFORMS PROCESSING IN COOPERATION WITH AN EXTERNAL APPARATUS, METHOD OF CONTROLLING THE SAME, PROGRAM AND IMAGE FORMING SYSTEM

(75) Inventors: Yuichi Utsumi, Yokohama (JP); Shinichi Chiba, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 177 days.

(21) Appl. No.: 13/152,841

(22) Filed: Jun. 3, 2011

(65) Prior Publication Data

US 2011/0299123 A1 Dec. 8, 2011

(30) Foreign Application Priority Data

Jun. 4, 2010 (JP) ................. 2010-129353

(51) Int. Cl.
*H04N 1/00* (2006.01)
*G03G 15/00* (2006.01)
*G06F 3/12* (2006.01)
*H04N 1/327* (2006.01)

(52) U.S. Cl.
CPC ....... *H04N 1/00204* (2013.01); *G03G 15/5087* (2013.01); *G06F 3/1222* (2013.01); *G06F 3/1263* (2013.01); *G06F 3/1274* (2013.01); *G06F 3/1285* (2013.01); *H04N 1/00915* (2013.01); *H04N 1/32789* (2013.01); *G03G 2215/00109* (2013.01); *H04N 2201/001* (2013.01); *H04N 2201/0094* (2013.01); *H04N 2201/3215* (2013.01); *H04N 2201/3219* (2013.01); *H04N 2201/3223* (2013.01); *H04N 2201/3273* (2013.01)

(58) Field of Classification Search
CPC ................ H04N 1/32789; G06F 3/1285
USPC .................. 358/1.15, 1.14, 1.16, 1.13
See application file for complete search history.

(56) References Cited

U.S. PATENT DOCUMENTS

| 6,832,221 B2 * | 12/2004 | Takahashi | ........ G06F 17/30011 |
| 7,509,317 B2 * | 3/2009 | Takahashi | ......... G06F 17/30011 |
| 7,545,522 B1 * | 6/2009 | Lou | ....................... G06F 3/1205 358/1.14 |

(Continued)

FOREIGN PATENT DOCUMENTS

| CN | 1838713 A | 9/2006 |
| JP | 8-186677 A | 7/1996 |

(Continued)

OTHER PUBLICATIONS

Japanese Office Action for corresponding JP 2010-129353, mail date Feb. 28, 2014.

(Continued)

*Primary Examiner* — Tammy Pham
*Assistant Examiner* — Walter Yehl
(74) *Attorney, Agent, or Firm* — Rossi, Kimms & McDowell LLP

(57) ABSTRACT

In an image forming apparatus being capable of executing a specific copy job to perform copy processing in cooperation with an external apparatus, when cancel of the specific copy job is instructed before completion of printing by a printing unit, the external apparatus is notified of the cancel of the specific copy job, and printing based on processed image data received by a reception unit is canceled.

9 Claims, 12 Drawing Sheets

(56) References Cited

U.S. PATENT DOCUMENTS

| | | | |
|---|---|---|---|
| 8,169,639 B2* | 5/2012 | Aoki | H04N 1/00209 358/1.13 |
| 2002/0001104 A1* | 1/2002 | Shima | G06K 15/00 358/442 |
| 2003/0041306 A1* | 2/2003 | Takahashi | G06F 17/30011 715/209 |
| 2003/0053109 A1* | 3/2003 | Lester | G06K 15/02 358/1.14 |
| 2005/0073726 A1* | 4/2005 | Nobuta | H04N 1/00127 358/468 |
| 2005/0152191 A1* | 7/2005 | Takahashi | G06F 17/30011 365/189.05 |
| 2006/0215208 A1* | 9/2006 | Takayama | H04N 1/00204 358/1.14 |
| 2006/0268310 A1* | 11/2006 | Tamai | H04N 1/00915 358/1.14 |
| 2006/0285127 A1* | 12/2006 | Sugimoto | H04N 1/00278 358/1.1 |
| 2007/0140722 A1* | 6/2007 | Kobayashi | G03G 15/5012 399/81 |
| 2007/0143361 A1* | 6/2007 | Arai | H04N 1/2307 |
| 2007/0211287 A1* | 9/2007 | Fujii | G06F 3/1204 358/1.16 |
| 2008/0013123 A1* | 1/2008 | Yoshioka | G03G 15/5012 358/1.15 |
| 2008/0170259 A1* | 7/2008 | Koshika | G06F 3/1208 358/1.15 |
| 2008/0246993 A1* | 10/2008 | Murakami | G06F 3/1207 358/1.15 |
| 2009/0216785 A1* | 8/2009 | Sato | H04L 63/0823 |
| 2009/0284784 A1* | 11/2009 | Morita | H04N 1/00233 358/1.15 |
| 2009/0307359 A1* | 12/2009 | Akita | G06F 3/1213 709/228 |
| 2009/0316190 A1* | 12/2009 | Nakagawa | G03G 15/5075 358/1.15 |
| 2010/0007916 A1* | 1/2010 | Ikeda | H04N 1/00347 358/1.15 |
| 2011/0128565 A1* | 6/2011 | Shimada | H04N 1/00222 358/1.13 |
| 2011/0255128 A1* | 10/2011 | Ozawa | G06F 3/1203 358/1.15 |
| 2011/0286031 A1* | 11/2011 | Jessen | G06F 3/1218 358/1.15 |
| 2013/0100490 A1* | 4/2013 | Imoto | G06F 3/1207 358/1.15 |

FOREIGN PATENT DOCUMENTS

| | | |
|---|---|---|
| JP | 2001-333237 A | 11/2001 |
| JP | 2009-296175 A | 12/2009 |
| JP | 2010-020639 A | 1/2010 |

OTHER PUBLICATIONS

Office Action issued in counterpart Chinese Patent Application No. 201110148550.4 dated Aug. 26, 2013.

* cited by examiner

IMAGE FORMING APPARATUS THAT PERFORMS PROCESSING IN COOPERATION WITH AN EXTERNAL APPARATUS, METHOD OF CONTROLLING THE SAME, PROGRAM AND IMAGE FORMING SYSTEM

BACKGROUND OF THE INVENTION

1. Field of the Invention

The present invention relates to an image forming apparatus, a method of controlling the same, a program, and an image forming system.

2. Description of the Related Art

An image forming apparatus is recently required to not only reduce the cost and size but also achieve greater functionality. A technique is known to meet these requirements, which causes an image forming apparatus and an external apparatus to cooperatively perform information processing so as to provide maximum functions and performance using limited hardware resource. This technique causes an image forming apparatus and an external apparatus (for example, a server or a PC) to cooperatively execute information processing and image processing, thereby implementing an extension function (for example, extension copy function) that cannot be provided by the hardware resource of the image forming apparatus.

For example, Japanese Patent Laid-Open No. 08-186677 proposes a technique which connects an image forming apparatus to an external apparatus such as a personal computer (to be referred to as a PC hereinafter), and causes the PC to process an image obtained by the image forming apparatus. In this publication, the PC executes image processing, which is executed by the image forming apparatus in the conventional copy function, thereby reducing use of the hardware resource of the image forming apparatus. In the publication, the PC also performs the operations (document reading start and various kinds of settings) of the image forming apparatus.

For the image forming apparatus, an extension copy function (pseudo copy function) has been proposed. This function processes an extensional copy function, which cannot be implemented by the hardware resource of the image forming apparatus, using the resource of an external apparatus such as a PC. The operation of this function can be done via the operation unit of the image forming apparatus. Hence, a scan driver program for controlling the document reading function of the image forming apparatus and a print driver program for controlling the print function are installed in the external apparatus. Upon receiving a copy start instruction from the user, the image forming apparatus notifies the external apparatus of the instruction. The external apparatus executes document reading, various kinds of image processing, and printing in accordance with the driver programs. Although document reading and printing are performed by the image forming apparatus, various kinds of image processing are executed by the driver programs and the hardware resource of the external apparatus. Even if the capacity of a memory provided in the image forming apparatus is small, the extension function allows layout processing and sort processing of multiple pages to be implemented by storing image data in the memory of not the image forming apparatus but the external apparatus. In addition, only a minimum necessary image forming unit is provided in the image forming apparatus. Complex advanced image processing and color processing are executed in accordance with an image processing program installed in the external apparatus. This enables to attain high functionality while reducing the cost of the image forming apparatus.

However, the above-described conventional technique has the problems to be described below. For example, a case is assumed in relation to the extension copy function in which when the user wants to cancel the extension copy operation in midstream, document read data has already been transferred to the external apparatus at that point of time. In this case, upon receiving the cancel instruction after the processing in the external apparatus has progressed, the image forming apparatus receives print data from the external apparatus and executes printing in spite of the cancel instruction. This is because the image forming apparatus recognizes the job of the extension copy function distinctively as a scan job and a print job in fact, and individual job IDs are assigned to the jobs. In addition, since the user's extension copy operation is performed in the image forming apparatus, the cancel instruction is grasped by the image forming apparatus but not by the external apparatus.

It is therefore necessary to send the cancel instruction to the external apparatus which receives document read data and executes processing. However, even if the image forming apparatus notifies the external apparatus of the cancel instruction, the already transferred document read data may remain in the external apparatus. This poses a problem from the viewpoint of both security and performance of the external apparatus.

SUMMARY OF THE INVENTION

The present invention enables realization of an image forming apparatus which appropriately cancels execution of a job to be processed in cooperation with an external apparatus when the job is canceled during the execution, a method of controlling the same, a program, and an image forming system.

One aspect of the present invention provides an image forming apparatus being capable of executing a specific copy job to perform copy processing in cooperation with an external apparatus, comprising: an accepting unit that accepts an execution instruction of the specific copy job; a reading unit that reads a document to generate image data; a transmission unit that, when the accepting unit receives the execution instruction of the specific copy job, transmits the image data generated by the reading unit to the external apparatus; a reception unit that receives, from the external apparatus, processed image data obtained by causing the external apparatus to process the image data transmitted by the transmission unit; a printing unit that prints an image on a printing material based on the processed image data received by the reception unit; and a cancel unit that, when cancel of the specific copy job is instructed before completion of printing by the printing unit, notifies the external apparatus of the cancel of the specific copy job and cancels the printing based on the processed image data received by the reception unit.

Another aspect of the present invention provides an image forming system comprising an information processing apparatus and an image forming apparatus being capable of executing a specific copy job to perform copy processing in cooperation with the information processing apparatus, the image forming apparatus comprising: an accepting unit that accepts an execution instruction of the specific copy job; a reading unit that reads a document to generate image data; a transmission unit that, when the accepting unit receives the execution instruction of the specific copy job, transmits the image data generated by the reading unit to the information processing apparatus; a reception unit that receives, from the information processing apparatus, processed image data obtained by causing the information processing apparatus to process the image data transmitted by the transmission unit; a printing unit that prints an image on a printing material based on the processed image data received by the reception unit; and a first cancel unit that, when cancel of the specific copy job is instructed before completion of printing by the printing unit, notifies the information processing apparatus of the cancel of the specific copy job and cancels the printing based on the processed image data received by the reception unit, and the information processing apparatus comprising: a second cancel unit that, when notified of the cancel of the specific copy job by the first cancel unit, cancels execution of the specific copy job and deletes information concerning the specific copy job.

Still another aspect of the present invention provides a method of controlling an image forming apparatus being capable of executing a specific copy job to perform copy processing in cooperation with an external apparatus, comprising: causing an accepting unit to accept an execution instruction of the specific copy job; causing a reading unit to read a document to generate image data; causing a transmission unit to, when the execution instruction of the specific copy job is received in the causing the accepting unit to accept the execution instruction, transmit the image data generated in the causing the reading unit to read the document to the external apparatus; causing a reception unit to receive, from the external apparatus, processed image data obtained by causing the external apparatus to process the image data transmitted in the causing the transmission unit to transmit the image data; causing a printing unit to print an image on a printing material based on the processed image data received in the causing the reception unit to receive the processed image data; and causing a cancel unit to, when cancel of the specific copy job is instructed before completion of printing in the causing the printing unit to print, notify the external apparatus of the cancel of the specific copy job and cancel the printing based on the processed image data received in the causing the reception unit to receive the processed image data.

Yet still another aspect of the present invention provides a computer-readable storage medium storing a computer program that causes a computer to execute a method of controlling an image forming apparatus.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Hardware Configuration of Image Forming Apparatus

Figure 1:
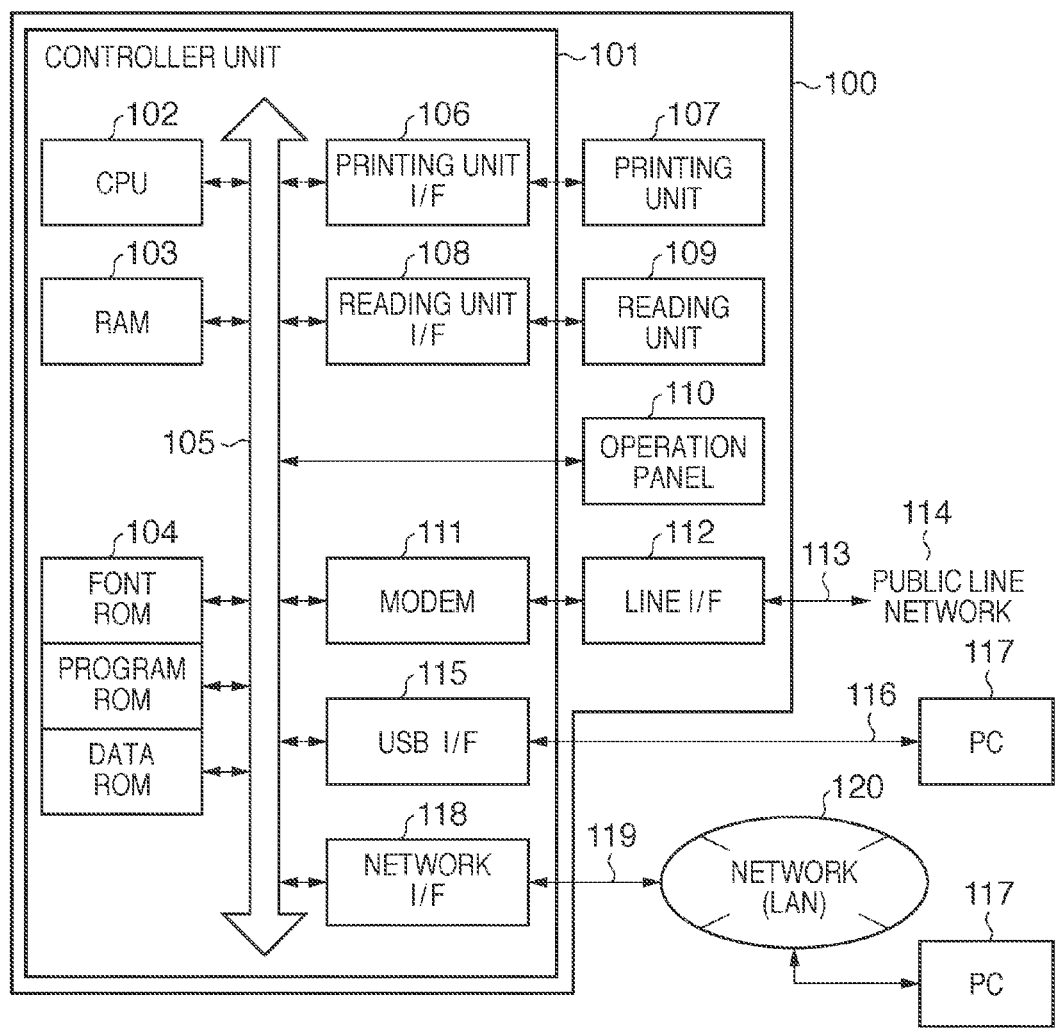
FIG. 1 is a block diagram showing an example of the hardware configuration of an image forming apparatus according to the first embodiment.

The first embodiment will now be described with reference to FIGS. 1 to 10. First, the hardware configuration of an image forming apparatus 100 of this embodiment will be described first with reference to FIG. 1. As shown in FIG. 1, the image forming apparatus 100 includes a printing unit 107, a reading unit 109, an operation panel 110, a line I/F 112, and a controller unit 101 that controls them.

The controller unit 101 comprises a CPU 102, a RAM 103, a ROM 104, a printing unit I/F 106, a reading unit I/F 108, a modem 111, a USB I/F 115, and a network I/F 118. The blocks are connected via a system bus 105 to be communicable with each other. The CPU 102 generally controls the blocks in accordance with various kinds of control programs. The various kinds of control programs are executed by reading out the control programs stored in the program area of the ROM 104. For example, the various kinds of control programs are executed by decompressing compressed data stored in the program area of the ROM 104 and expanding them on the RAM 103. The various kinds of control programs may be stored in a hard disk drive (HDD) (not shown) in a compressed/uncompressed state.

The network I/F 118 performs communication processing with a host computer 117 (to be referred to as a PC hereinafter) via a network (LAN) 120 or the like. The image forming apparatus 100 according to this embodiment can execute a cooperation job which is to be executed in cooperation with the PC 117 serving as an external apparatus or an information processing apparatus. That is, the image forming apparatus 100 of this embodiment is connected to the PC 117 via a network so as to constitute an image forming system. The network I/F 118 and the network 120 are connected via a communication cable such as a LAN cable 119. The modem 111 is connected to a public line network 114 via the line I/F 112 to perform communication processing with another image forming apparatus, a facsimile apparatus, a telephone, or the like (not shown). The line I/F 112 and the public line network 114 are generally connected by a telephone line 113.

The printing unit I/F 106 is an interface that outputs an image signal to the printing unit 107 (printer engine). The reading unit I/F 108 is an interface that inputs a read image signal from the reading unit 109 (scanner engine). The CPU 102 processes the image signal input from the reading unit I/F 108 and outputs it to the printing unit I/F 106 as a print image signal.

The CPU 102 displays characters and symbols on the display unit of the operation panel 110 using font information stored in the font area of the ROM 104, or receives instruction information from the operation panel 110 that has received a user instruction. The CPU 102 stores the device information of the image forming apparatus 100, the telephone directory information and department management information of users, and the like in the data area of the ROM 104. The pieces of information are read out by the CPU 102 as needed and updated as needed.

<Arrangement of Operation Panel>

Figure 2:
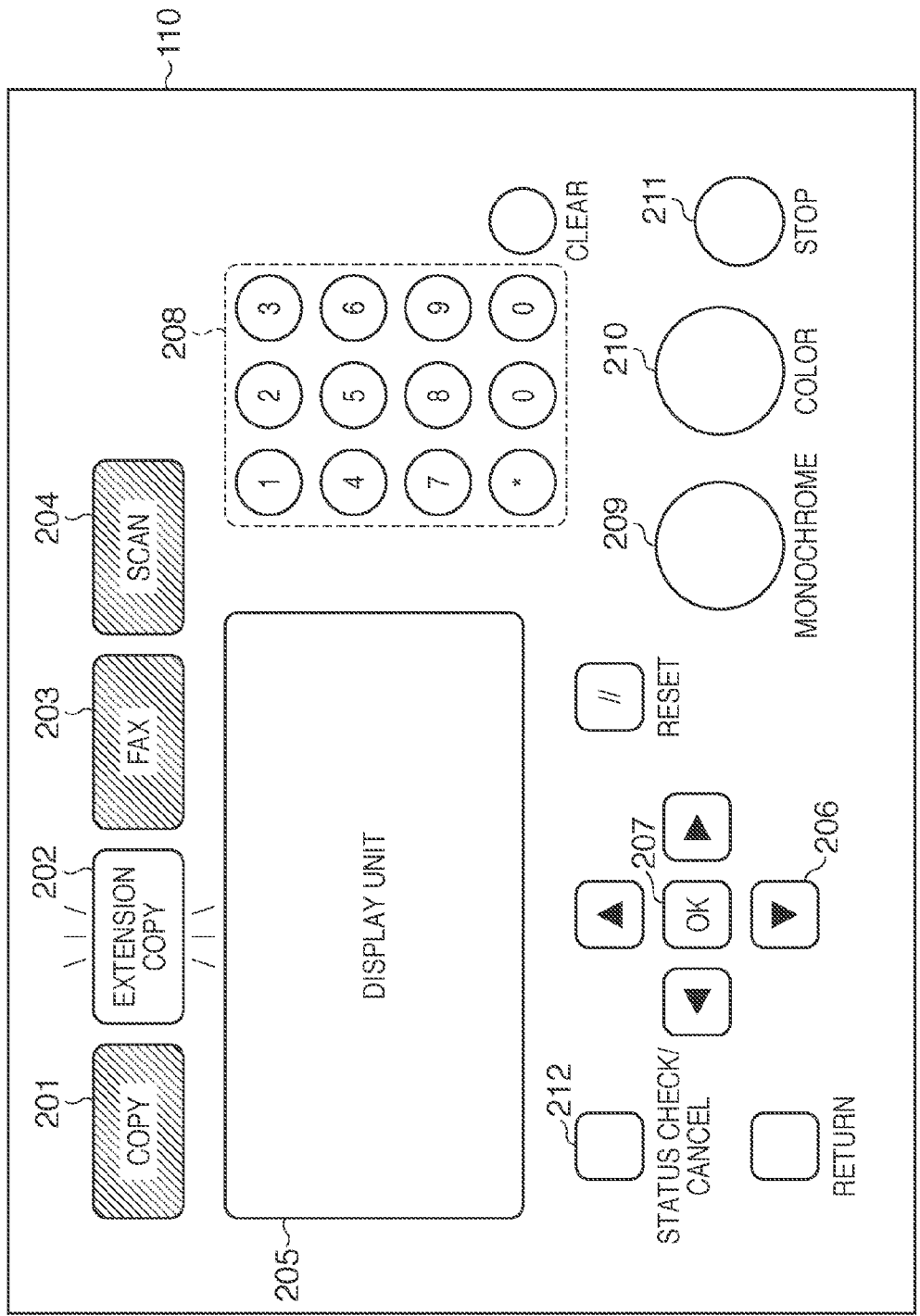
FIG. 2 is a view showing the operation panel of the image forming apparatus according to the first embodiment.

The operation panel 110 of the image forming apparatus 100 of the embodiment will be described next in detail with reference to FIG. 2. The image forming apparatus 100 according to the embodiment has a copy function by the reading unit 109 and the printing unit 107 described above, a scan function by the reading unit 109 and the USB I/F 115, and the like. The image forming apparatus 100 also has a facsimile function by the modem 111 and a function of printing instructed by the PC 117 via a USB (Universal Serial Bus) 116 or the network 120.

The operation panel 110 will be explained below. The operation panel 110 includes function keys 201 to 204 to be used to select the above-described functions. The user presses the button of a function to be used. The operation panel 110 also includes a display unit 205 configured to notify the user of the set state and the device state of the image forming apparatus 100. Arrow keys 206 are used to move a cursor or the like displayed on the display unit 205. As shown in FIG. 2, the arrow keys 206 include four, up, down, left, and right buttons. An OK key 207 is arranged in the middle of the arrow keys 206. The OK key 207 has the function of an "enter" key for a setting or a query. For example, to change a copy setting (paper size), the user presses the copy function button 201 to display the copy function screen, selects the item (paper size) to be changed using the arrow keys 206, and presses the OK key 207. The screen then transits to a setting screen that allows selection. The user moves, using the arrow keys 206, the cursor to the position of the desired setting and presses the OK key 207, thereby deciding the setting. To input, for example, the number of copies or a telephone number in the facsimile function, the user uses a ten-key pad 208.

The operation panel 110 also includes a monochrome start key 209 and a color start key 210 which serve as keys to instruct the start of copy, scan, or facsimile. In this embodiment, the color start key 210 is illustrated assuming a color copy function. On the other hand, an image forming apparatus having only a monochrome reading function or a monochrome print function may include only the monochrome start key 209 as the start key. An image forming apparatus having a function of, upon reading a document, determining whether the document is color or monochrome also need not always have the start key shown in FIG. 2.

A stop key 211 instructs to stop the operation of each function. On the other hand, the user can stop an operation by selecting, using a status check/cancel key 212, processing to be stopped from the status check screen of the processing that is currently progressing in the image forming apparatus 100. In this case as well, the selection and decision are done using the arrow keys 206 and the OK key 207 described above.

<Extension Copy Function>

An example of an extension copy function will be described next with reference to FIG. 3. The extension copy function is a copy function (cooperation job) that is cooperatively executed by the image forming apparatus 100 and the PC 117 connected to the image forming apparatus 100 via the USB 116 or the network 120. In this function, the image forming apparatus 100 and the PC 117 cooperatively implement, using the hardware resource (including control programs stored in the hardware resource) of, for example, the PC 117 serving as an external apparatus, a function that cannot be implemented by the hardware resource of the image forming apparatus 100.

Figure 3:
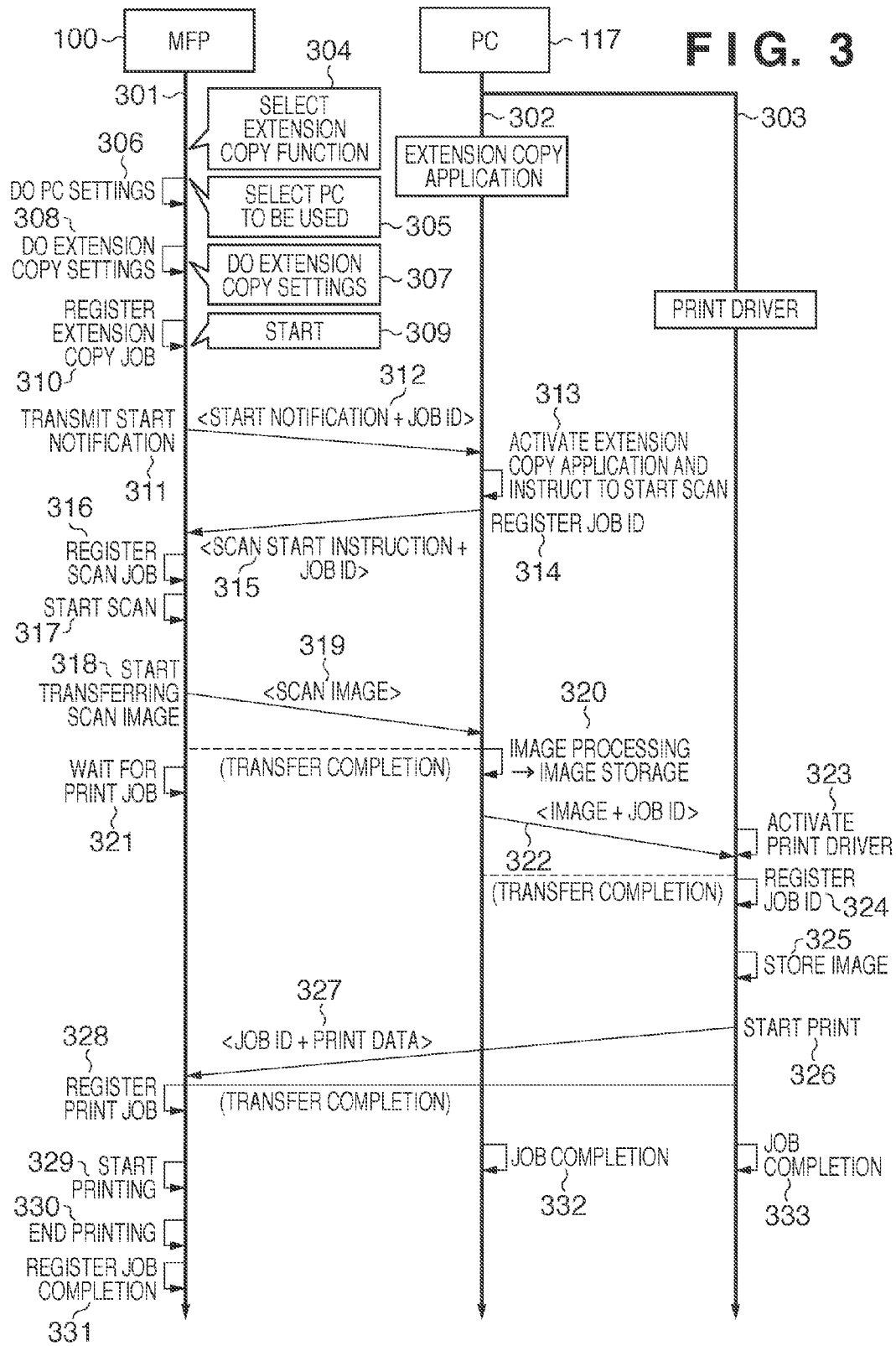
FIG. 3 is a sequence chart of a PC and the image forming apparatus according to the first embodiment.

FIG. 3 is a sequence chart of the extension copy operation of the image forming system according to this embodiment, which is implemented cooperatively by the image forming apparatus 100 (referred to as MFP in FIG. 3) and the PC 117. A time axis 301 on the left side of FIG. 3 represents the sequence of the image forming apparatus 100. Two time axes on the right side represent the sequence of the PC 117. The two time axes of the PC 117 are the time axis of an extension copy application 302 that controls cooperation with the image forming apparatus 100 and the time axis of a print driver 303 that controls print processing. Note that 304, 305, 307, and 309 represent user operations. The description of FIG. 3 will be done assuming that an extension copy application and a print driver corresponding to the image forming apparatus 100 are preinstalled in the PC 117. Note that the processing of the image forming apparatus 100 to be described below is implemented by the CPU 102, and the processing of the PC 117 is implemented by the CPU (not shown) of the PC 117.

First, in 304, the user selects the extension copy function. That is, the user presses the extension copy key 202 of the operation panel 110. In 306, the image forming apparatus 100 displays a selection screen on the display unit 205 to notify the user of the screen to select the PC to cooperate. In 305, the user selects the PC to cooperate. In 308, the image forming apparatus 100 receives necessary settings from the user prior to the extension copy. In 307, the user inputs necessary settings via the operation panel 110. Note that if the user uses initial settings, the process 308 is omitted. When preparation is completed by doing document placement and user's extension copy settings, the image forming apparatus 100 waits for the user's start instruction.

When the user instructs the start in 309, the image forming apparatus 100 issues the ID number of an "extension copy job" distinguished from a normal copy job and registers the job in 310. Registration here indicates storing the job in a memory such as the RAM 103 or a hard disk.

The job ID (job identifier) will be described here. In this embodiment, a copy job, an extension copy job, a print job, a scan job, a FAX sending job, a FAX receiving job, and the like are managed in the image forming apparatus 100. Each job is managed by an ID number and stored in the ROM 104 as data. For example, the ID of a copy job (normal copy) is expressed by "prefix symbol+number" like CPnnnnnn" (n is a positive integer). The prefix symbol represents the function (for example, CP represents the copy function) to be executed by the job, and the number represents the job number assigned to the job. On the other hand, the ID of a scan job or a print job is expressed by "SNnnnnnn" or "PRnnnnnn" in this embodiment.

In this embodiment, the extension copy function is a copy function implemented cooperatively by the PC 117 and the image forming apparatus 100. The extension copy function according to this embodiment is the combination of the "scan function" and the "print function" of the image forming apparatus. Hence, the job instruction from the PC is executed not on the path of an "extension copy job" but on the same path as that of a "scan job" or a "print job". To do this, the extension copy job ID needs to be associated with the scan job ID and the print job ID that are combined to implement the function.

Hence, according to the present invention, the scan job ID and the print job ID are set to SNennnnn (e: specific integer) and PRennnnn and thus associated with the extension copy job ID. If the number at the most significant digit of the integer immediately after the prefix symbol is "e" representing the scan job or print job of extension copy, the cooperation job can clearly be distinguished from a normal scan job or a normal print job. That is, "e" is cooperation information representing a cooperation job. An ID such as ECPnnnnn may be used to distinguish the extension copy job ID from a normal copy job ID.

Alternatively, "e" representing an extension copy ID may be added to the most significant digit of the integer after the prefix symbol of a normal copy job ID so as to express and manage the extension copy job ID by "CPennnnn". For example, when "e" representing an extension copy job is 9, the extension copy job ID is expressed by "CP900001". The scan job and the print job associated with the extension copy are expressed by "SN900001" and "PR900001" using the same number as that of the extension copy job. A job having a job ID whose number portion has "9" at its most significant digit is determined as a job associated with extension copy. Scan and print jobs having the same number for the remaining five digits are associated with an extension copy job having the same five-digit number.

Referring back to FIG. 3, in 311, the image forming apparatus 100 notifies the PC 117 selected by the user of the start of extension copy. At this time, the image forming apparatus 100 transmits information 312 including the start notification and the above-described job ID (first job identifier) to the PC 117.

Upon receiving the information 312 including the start notification and the job ID, the PC 117 activates the extension copy application 302 and instructs the image forming apparatus 100 to start document scan in 313. At this time, the PC 117 transmits information 315 including the document scan start instruction and a job ID (second job identifier) to the image forming apparatus 100. That is, the CPU of the PC 117 functions here as a second issue unit that issues the second job identifier. In 314, the extension copy application 302 registers the job ID in the job management list of its own. Since it is a scan job as part of the extension copy function, as described above, a job ID such as "SNennnnn" is registered to indicate the scan job of extension copy. The "nnnnn" portion is preferably the same number as that of the job ID issued by the image forming apparatus 100 in 311. This allows to easily identify that the jobs represented by the two job IDs are associated. That is, the job ID allows to identify the job as the scan job of extension copy. The extension copy application 302 may be configured to record the job ID and the job result as a history even after completion of the extension copy function.

Upon receiving the information 315 including the document scan start instruction and the scan job ID from the extension copy application 302, the image forming apparatus 100 registers the job in 316, and starts document scan in 317. Note that FIG. 3 illustrates processing of executing extension copy of one document for the descriptive convenience.

In 318, the image forming apparatus 100 transfers image data 319 obtained by scanning the document to the PC 117 directly (as RAW data) or as data that has undergone image processing implementable by the hardware resource of the image forming apparatus 100. In 320, the extension copy application 302 performs predetermined image processing for the transferred image data, encodes it as needed, and stores the image in the memory. If there are a plurality of documents, the extension copy application 302 repeats the same processing for successively transferred image data, and stores the processed image data in the memory till the end of transfer of all image data. When all scan image data have been transferred, the image forming apparatus 100 switches to a waiting state in 321 until the PC 117 instructs a print job.

Next, the PC 117 causes the print driver installed in it to execute print processing of the data stored in the memory by the extension copy application 302. To do this, the PC 117 activates the print driver 303 in 323. When the print driver 303 is activated, the extension copy application 302 sends information 322 including the image and the job ID to the print driver 303 and instructs printing. Note that in place of the image, address information of the memory that stores the image may be sent.

Upon receiving the print instruction, the print driver 303 assigns and registers a print job ID following the integer portion of the received job ID in 324. As described above, the ID is set to, for example, "PRennnnn" indicating the print job of extension copy. While storing (spooling) the image data received from the extension copy application 302 in 325, the print driver 303 transmits a print job instruction to the image forming apparatus 100 in 326. The print driver 303 transmits information 327 including print data to be used for image formation by the image forming apparatus 100 and the job ID registered in 324. Note that the print data included in the information 327 is the image data that has undergone the image processing of the extension copy application 302. In response to the image data received in 319, the PC 117 thus processes the image data and transmits it together with the job ID (second job identifier) issued on the side of the PC 117.

In 328, the image forming apparatus 100 receives the job, like a normal print job. The image forming apparatus 100 determines based on the included job ID that the job is associated with the extension copy that is being executed, and registers the print job together with that information. After that, the image forming apparatus 100 starts printing on a printing material in accordance with the received print data in 329. When the print processing has normally ended in 330, the image forming apparatus 100 registers normal termination in the extension copy job history in 331. On the other hand, if transfer of the information 327 is normally completed, the print driver 303 and the extension copy application 302 register completion of the job in 333 and the 332, respectively. If no history need be recorded, the print driver 303 and the extension copy application 302 delete the job ID registered as the job that is being executed.

As described above, according to the present invention, it is possible to distinguish a job associated with extension copy by changing part of the conventional copy job ID, scan job ID, and print job ID to a specific "symbol" while holding their formats. According to the present invention, the job ID is very effective "when canceling a job during execution" to be described below.

<Cancel Control During Extension Copy>

Figure 7:
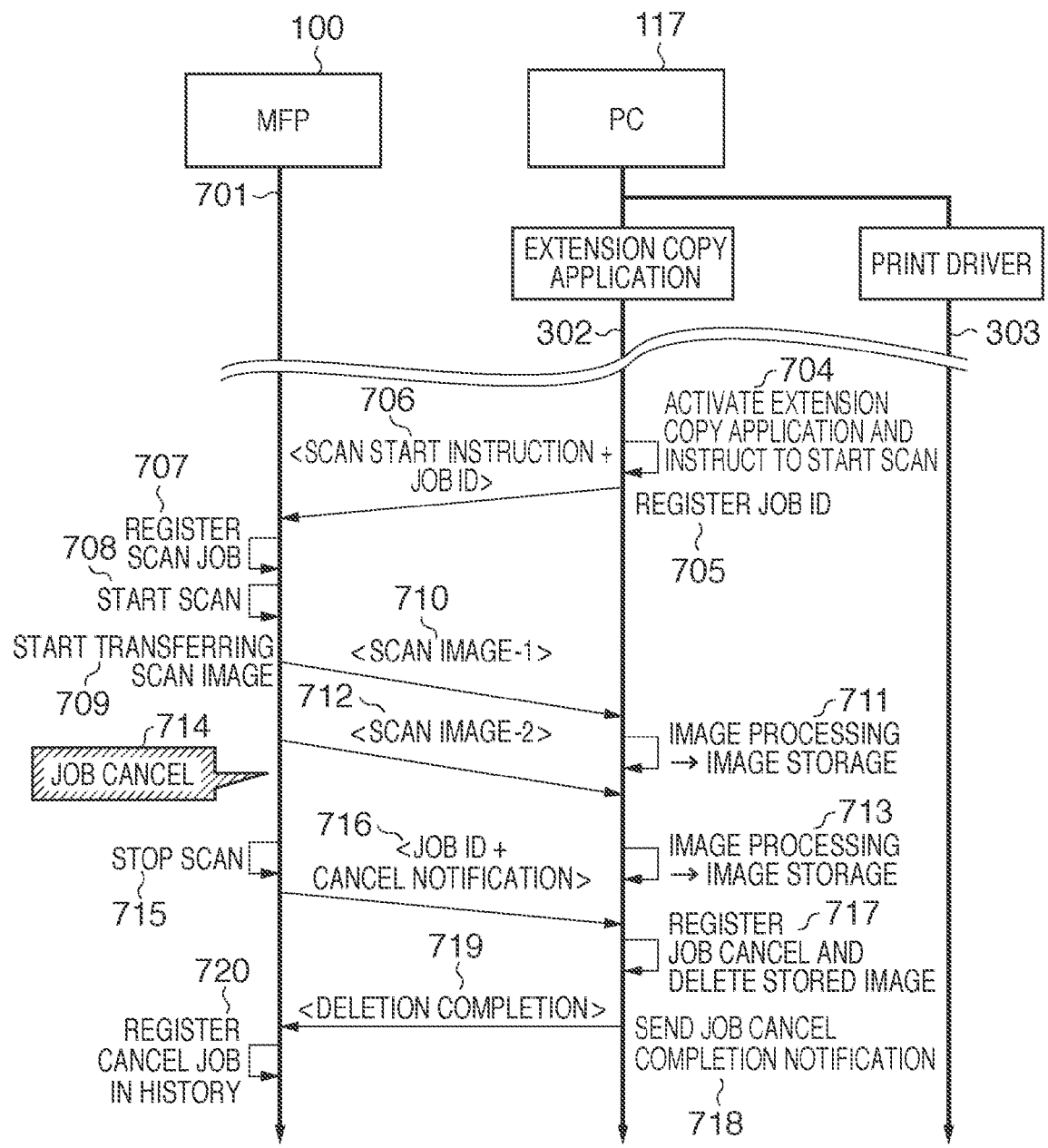
FIG. 7 is a sequence chart when canceling extension copy according to the first embodiment during scan.
Figure 8:
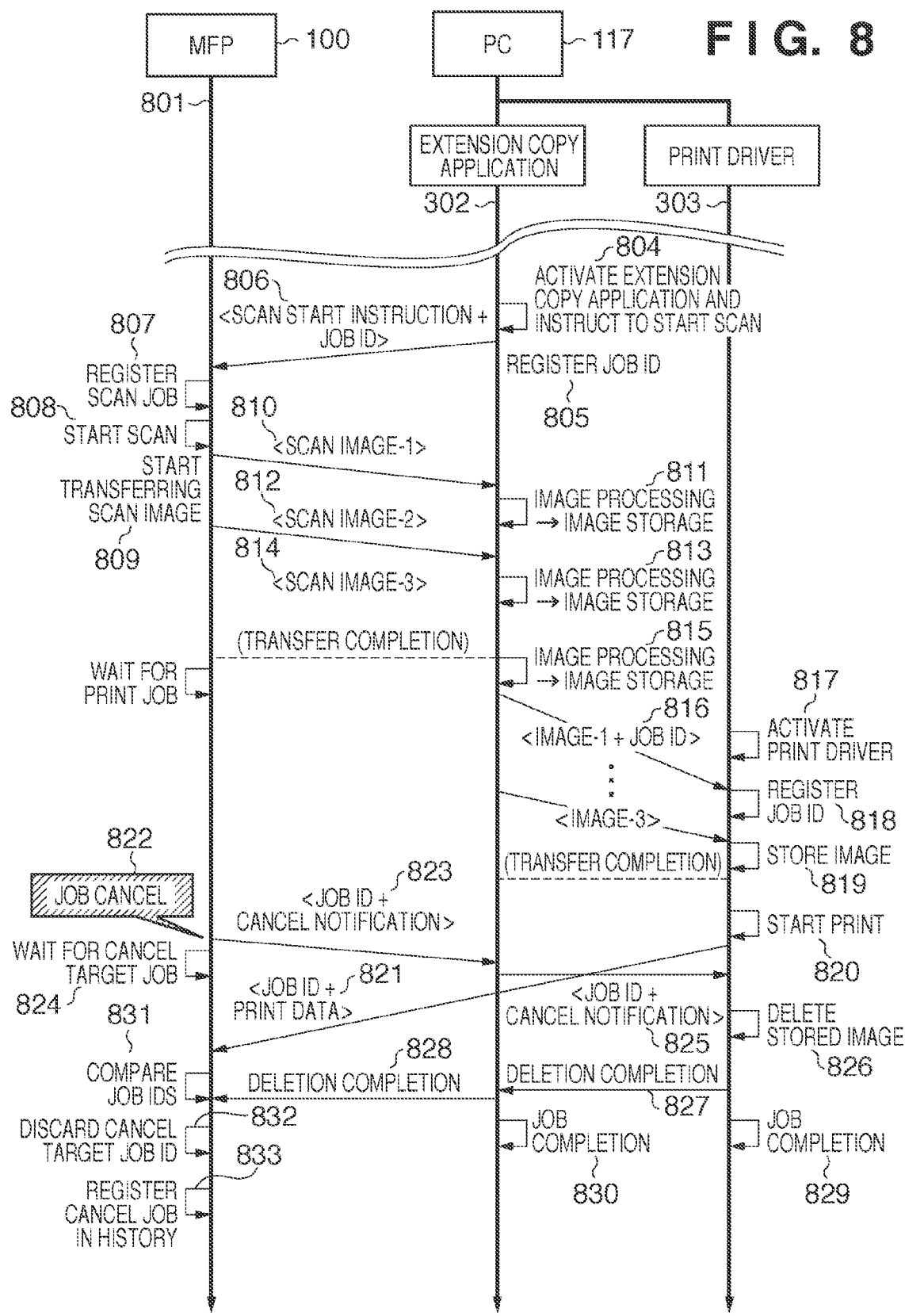
FIG. 8 is a sequence chart when canceling extension copy according to the first embodiment during printing.

Control when canceling extension copy based on a user instruction will be described below with reference to FIGS. 7 and 8. FIGS. 7 and 8 are sequence charts illustrating the processing procedure of the image forming apparatus 100 and the PC 117 connected to it, like FIG. 3. FIGS. 7 and 8 will be explained assuming that there are three copy documents. First, control to be performed when the user instructs cancel between the start of the scan operation of extension copy and the start of the print operation will be described with reference to FIG. 7. Control up to transmission of the extension copy start notification to the PC 117 is the same as that up to 312 of FIG. 3 and is omitted in FIG. 7. Note that the processing of the image forming apparatus 100 to be described below is implemented by the CPU 102, and the processing of the PC 117 is implemented by the CPU (not shown) of the PC 117.

As shown in FIG. 3, when the user instructs to start extension copy, the image forming apparatus 100 registers the extension copy job ID and transmits the start notification and the job ID to the PC 117 in 304 to 312. For example, assume that the extension copy job ID is "CP900123". The description from here will be made with reference to FIG. 7. In 704 to 706, the PC 117 activates the extension copy application 302 upon receiving the start notification and transmits a document scan start instruction to the image forming apparatus 100. At this time, the extension copy application 302 transmits "SN900123" together as a scan job ID in 706.

In 707 and 708, the image forming apparatus 100 registers the scan job ID "SN900123" upon receiving the instruction from the PC 117 and starts document scan. After that, in 709, the image forming apparatus 100 transfers image data obtained by scan to the PC 117. Reference numeral 710 represents transfer of image data of the first document; and 712, transfer of image data of the second document. On the other hand, the extension copy application 302 performs image processing for the transferred image data of the documents and stores them in the memory in 711 and 713.

The description will be made assuming that the image forming apparatus receives a cancel instruction 714 from the user at the timing scan of two of the three documents is completed. After starting transferring the image data of the second document in 712, the user inputs a cancel instruction in 714. Upon receiving the cancel instruction, the image forming apparatus 100 stops the scan operation of the third page during execution in 715. After that, in 716, the image forming apparatus 100 sends a cancel notification to the PC 117 together with the job ID. Note that the processing of the image forming apparatus 100 in 715 and 716 is an example of processing of a first cancel unit.

Upon receiving the job ID and the cancel notification, the extension copy application 302 on the PC 117 specifies the scan job ID corresponding to (associated with) the received job ID and cancels the scan job in 717. At the same time, the extension copy application 302 deletes the image data (of two pages) stored in the memory so far. When the processing has ended to this time, the extension copy application 302 notifies the image forming apparatus 100 of the completion of job deletion in 718. Note that the processing of the PC 117 in 715 and 716 is an example of processing of a second cancel unit. Upon receiving a deletion completion notification 719, the image forming apparatus 100 registers cancel termination of the extension copy job in the extension copy job history in 720, and ends the processing.

Control to be performed when the user instructs cancel between the end of the scan operation of extension copy and the completion of the print operation will be described next with reference to FIG. 8. Note that the processing of the image forming apparatus 100 to be described below is implemented by the CPU 102, and the processing of the PC 117 is implemented by the CPU (not shown) of the PC 117.

Assume that the extension copy operation progresses as shown in FIGS. 3 and 7, and the user cancels the job in 822 after the extension copy application 302 has transferred image data to the print driver 303 in 804 to 819. At this point of time, the PC 117 is not notified of the job cancel. For this reason, the print driver 303 on the PC 117 is executing image processing or image storage processing for the print operation in 818 and 819. After that, the print driver 303 starts printing in 820 and transmits print data to the image forming apparatus 100 together with the job ID in 821.

On the other hand, upon receiving the job cancel instruction, the image forming apparatus 100 notifies the PC 117 that the job has been canceled together with the job ID in 823. After that, in 824, the image forming apparatus 100 registers the job ID of the cancel target as a "cancel target job ID". This is for comparison with the job ID transmitted together with the print job when the print job is executed from the PC 117 before the job cancel notification. That is, the cancel target job ID is registered to determine whether the print job received from the PC 117 is a normal print job or the print job of extension copy canceled by the user and thus determine whether to execute the received print job.

Upon receiving the job cancel notification from the image forming apparatus 100, the extension copy application 302 on the PC 117 notifies the print driver 303 of the print job cancel together with the job ID in 825. Upon receiving the cancel notification, the print driver 303 deletes the stored (spooled) print job in 826 and cancels print data transfer to the image forming apparatus 100. If the print job transfer to the image forming apparatus 100 has already begun at this point of time, the image forming apparatus 100 checks the job ID and determines whether it is the "cancel target job ID" in 831. For example, in this case, if the received job ID includes "900123" of the job ID "CP900123" registered in 310 of FIG. 3, the image forming apparatus determines that the job ID is the cancel target job ID. Upon determining the "cancel target job ID", the image forming apparatus 100 discards the print job without execution in 832. Note that the processing of the image forming apparatus 100 in 823, 824, 831, and 832 is an example of processing of the first cancel unit, and the processing of the PC 117 in 826 to 828 is an example of processing of the second cancel unit.

On the other hand, when deletion of the job corresponding to the job ID of the cancel notification is completed, the print driver 303 notifies the extension copy application 302 of it in 827, registers the completion of the job in 829, and deletes the job ID. Accordingly, the extension copy application 302 notifies the image forming apparatus 100 of the completion of job deletion in 828, registers the completion of the job in 830, and deletes the job ID. Upon receiving the job deletion completion notification 828 from the PC 117, the image forming apparatus 100 registers the "canceled job" in the extension copy job history in 833.

<Display Screen>

Figure 5:
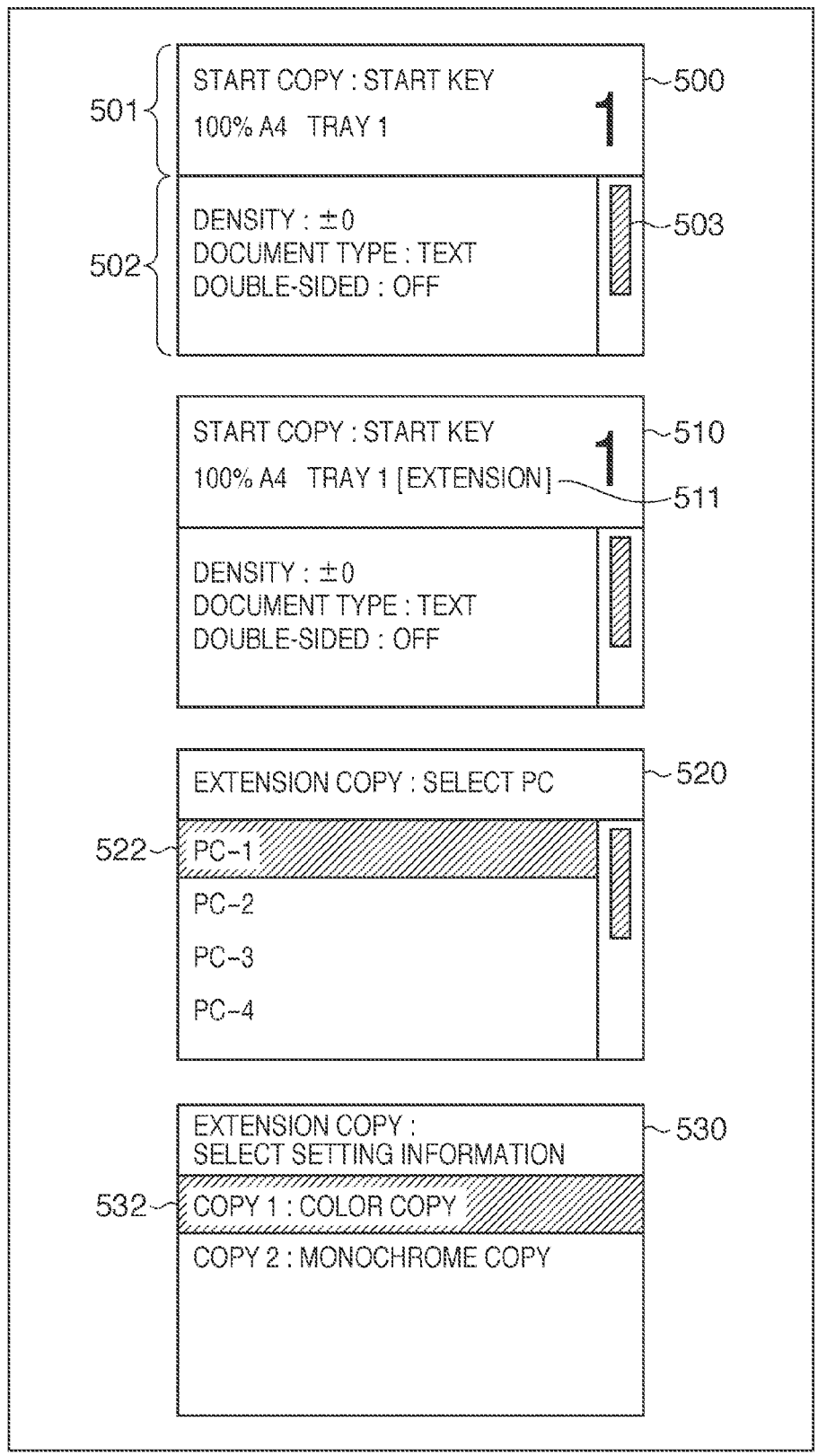
FIG. 5 is a view showing an operation panel display unit during the extension copy operation according to the first embodiment.
Figure 6:
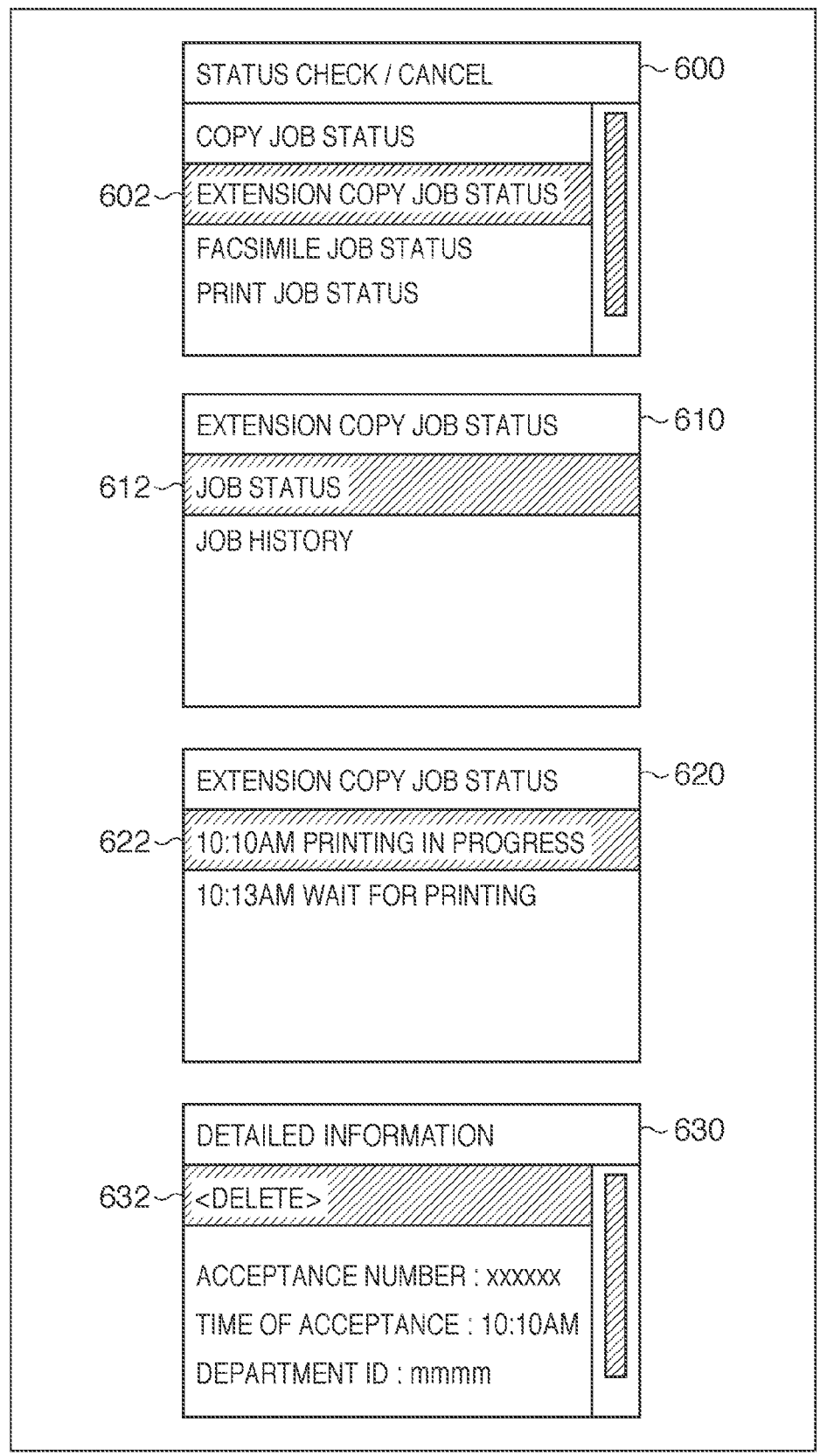
FIG. 6 is a view showing the display unit when canceling extension copy according to the first embodiment.

Display on the display unit 205 mounted on the operation panel 110 of the image forming apparatus 100 will be described next with reference to FIGS. 5 and 6. FIG. 5 shows display when the copy function and the extension copy function are selected. The screen displayed on the display unit 205 will be expressed as a UI screen (User Interface screen) hereinafter.

A UI screen 500 is displayed when the user presses the copy function button 201 of the function keys. A portion 501 displays the representative setting states of the copy function and the status information. A portion 502 lists various kinds of setting items and displays information selected and decided by moving the cursor using the up and down keys of the arrow keys 206 and pressing the OK key 207. The setting items 502 also include items other than the displayed three. The items are successively displayed on the lower side by pressing the down key of the arrow keys 206. A scroll bar 503 indicates the position of the cursor.

When the user presses the extension copy key 202 of the function keys, a UI screen 510 is displayed on the display unit 205. For distinction from the UI screen of the normal copy function, an indication that indicates the UI screen of the extension copy function may be added, like 511. Setting items implementable by extension copy are added to the various kinds of setting items.

In the extension copy function, a function is implemented in cooperation with the PC 117 connected to the image forming apparatus 100. Hence, the user needs to select the PC to cooperate. A UI screen 520 is an example of the screen to select the PC to cooperate. An item having a black background and white characters indicates the position of a cursor 522. To decide the PC to use, the user places the cursor 522 on the desired PC and presses the OK key 207.

On the other hand, a case is assumed as one embodiment of the extension copy function in which the extension copy application on the PC 117 is caused to select setting information. In this case, the user sets several (one or more) extension copy settings on the PC 117 in advance. When the image forming apparatus 100 executes the extension copy function, the user only selects the extension copy settings that have been done in advance. In this case, a UI screen 530 is used as the setting selection screen. Examples of items to be set on the side of the PC 117 are whether the document type is color or monochrome, the document size, the printing paper size (scaling factor), the layout, and the resolution. In this embodiment, the above-described setting items are used. However, any other setting items associated with copy may also exist.

The job status check UI screen of the extension copy job and the cancel procedure will be described next with reference to FIG. 6. The user can check the status of the job that is currently being executed by pressing the status check/cancel key 212 of the operation panel 110. An example of the status check/cancel UI screen displayed upon pressing the status check/cancel key 212 is a UI screen 600. The items are classified by function into the copy job status, the print job status, and the like. The user selects a function to check by a cursor 602. A description will be made assuming that the extension copy job status is checked.

When the extension copy job status is selected on the UI screen 600, the screen transmits to a UI screen 610. The user can select, on the UI screen 610, whether to check the status of a job that is currently being executed or check the job history up to this time. When the user selects the job status on the UI screen 610 using a cursor 612, a UI screen 620 that displays the list of the statuses of extension copy jobs that are currently being executed is displayed. For example, the UI screen 620 indicates that there exist two jobs, that is, a job that has been received at 10:10 AM and is being printed and a job that has been received at 10:13 AM and is waiting for execution of printing.

To cancel the job that is being executed, the user selects the job to cancel on the UI screen 620 using a cursor 622 and decides it by the OK key 207. When the job is selected and decided by the OK key 207, the screen transits to a UI screen 630. This screen displays detailed information of the selected extension copy job and allows the user to select whether to delete (that is cancel) the job. When the user selects and decides <delete> by a cursor 632 on the UI screen 630, the extension copy job is deleted (canceled)

Another cancel method uses the stop key 211 of the operation panel 110. For example, when the user presses the stop key 211 during document scan of an extension copy job, the image forming apparatus determines it as an immediate cancel instruction and cancels the job.

<Control Procedure>

Figure 9:
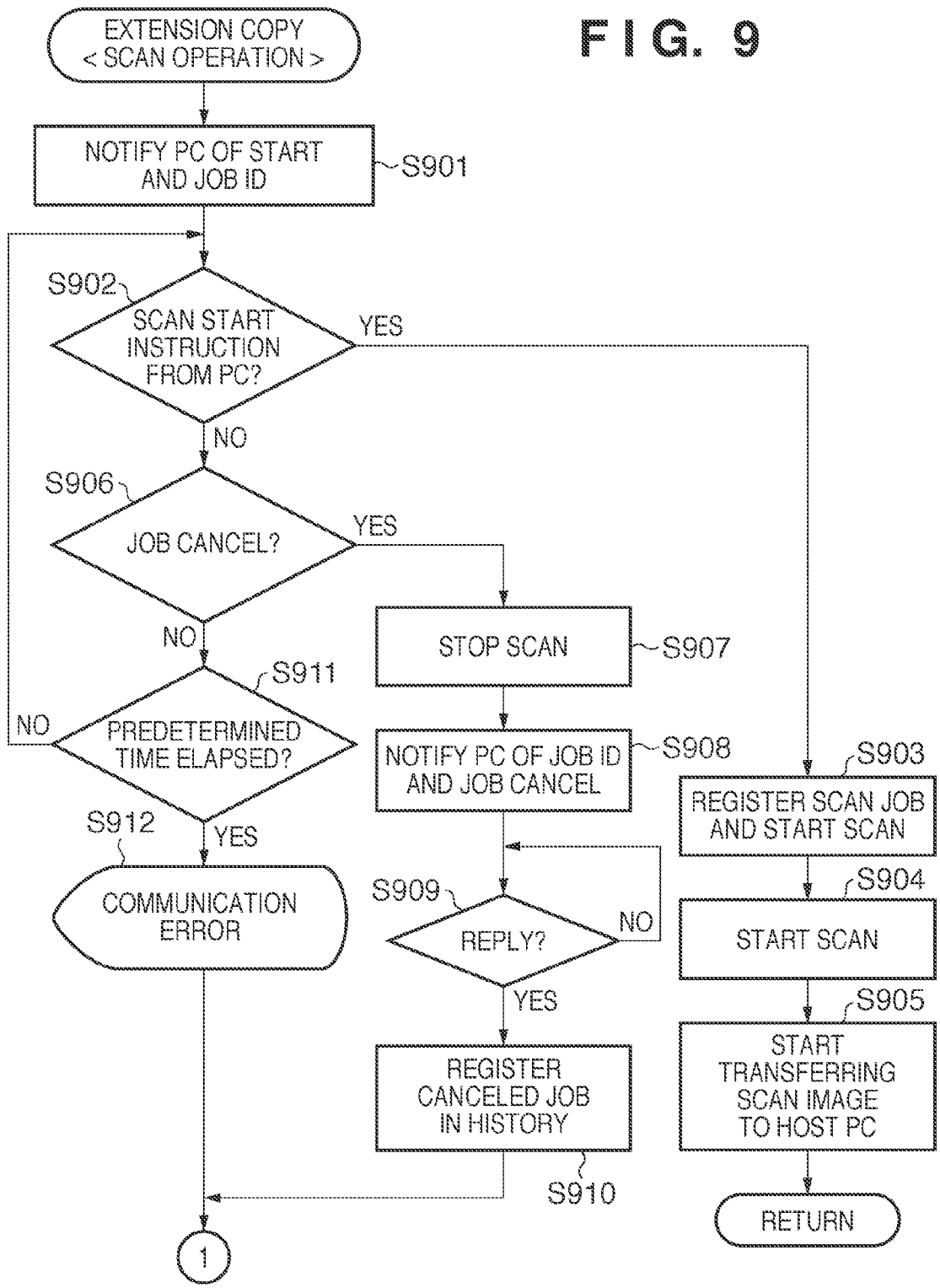
FIG. 9 is a flowchart for explaining the scan operation of extension copy according to the first embodiment.
Figure 10:
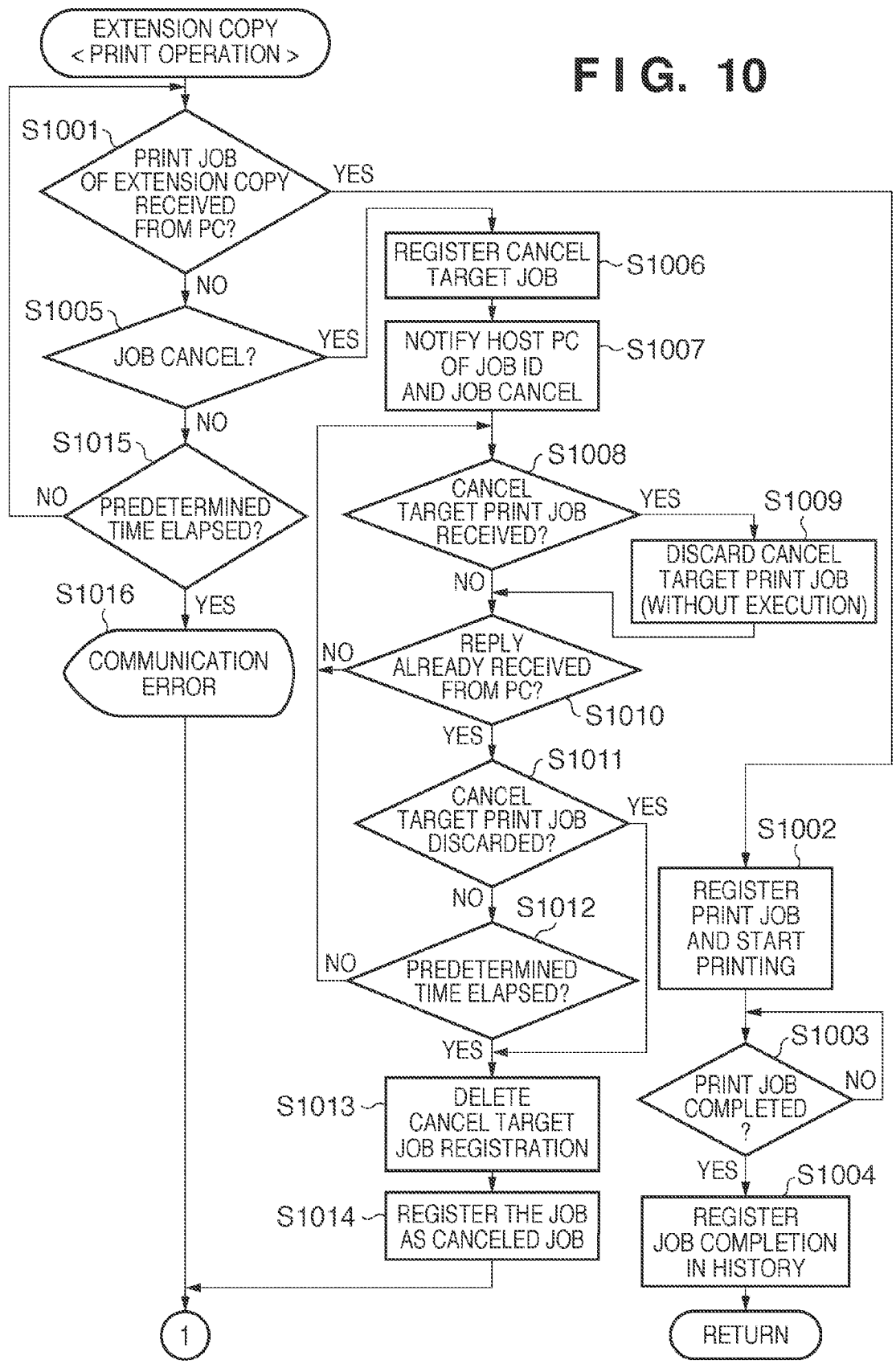
FIG. 10 is a flowchart for explaining the print operation of extension copy according to the first embodiment.

The control procedure of the extension copy operation in the image forming apparatus 100 to which the present invention is applied will be described next with reference to FIGS. 4, 9, and 10. Note that the processing to be described below is implemented by causing the CPU 102 of the image forming apparatus 100 to execute a program read out from the ROM 104 or the like. Control to be performed when the user selects the extension copy function will be explained first with reference to FIG. 4.

As described above in the example of the extension copy operation, the CPU 102 displays the PC selection screen and accepts selection of the PC to cooperate in step S401. In step S402, the CPU 102 displays the setting selection screen of the selected PC and accepts selection of extension copy settings that have been done in advance. When settings are completed, the CPU 102 waits for the start instruction from the user in step S403.

Upon receiving the start instruction, the process advances to step S404. The CPU 102 first functions as the first issue unit to issue an ID for the extension copy job and registers it in the job list. In step S405, the CPU 102 advances to the subroutine of extension copy <scan operation>. Details of the subroutine will be described later with reference to FIG. 9.

When the subroutine of extension copy <scan operation> in step S405 is completed, the CPU 102 stands by till the end of scan image data transfer to the PC in step S406. When the transfer to the PC is completed, the process advances to step S407, and the CPU 102 transits to the standby state. The standby state means a waiting state until a print job is received from the PC after image processing and the like. At this point of time, the CPU may transit to a state in which the CPU can accept the next job (for example, normal copy, extension copy, scan, print, or FAX sending) or a state in which the CPU is prohibited from accepting another job before the print job from the PC is completed.

After that, the CPU 102 advances to the subroutine of extension copy <print operation> in step S408. Details of extension copy <print operation> will be described later with reference to FIG. 10. When the subroutine of extension copy <print operation> has ended, the CPU 102 ends the extension copy operation. On the other hand, if error processing different from usual has occurred in extension copy <scan operation> in step S405 or extension copy <print operation> in step S408, the CPU 102 advances to step S409 to directly end the extension copy operation.

The subroutine of extension copy <scan operation> in step S405 will be described next with reference to FIG. 9. First, in step S901, the CPU 102 transmits the start notification to the PC 117 selected by the user together with the job ID assigned in step S404. At this time, the CPU 102 transmits the extension copy settings selected in step S402 to the PC 117.

In step S902, the CPU 102 waits for the scan job execution instruction from the PC 117. On the other hand, the CPU 102 also accepts cancel by the user during waiting for the execution instruction in step S906. Timeout is necessary when the execution instruction from the PC 117 cannot be received because of a communication error or the like. For this reason, the CPU 102 determines in step S911 whether a predetermined time has elapsed from the start notification.

Upon receiving the scan job execution instruction from the PC 117 in step S902, the CPU 102 assigns a scan job ID that matches the number of the received job ID and registers it in the job list in step S903. In step S904, the CPU 102 starts scanning the set document. The scan can be either platen scan (BOOK scan) or ADF (Automatic Document Feeder) scan. After that, in step S905, the CPU 102 transfers the scanned image data to the PC 117 without processing it in the image forming apparatus 100. If there are a plurality of documents, the CPU 102 sequentially transfers the scan images to the PC 117 in the order scan-completed. Note that the image data may be transferred to the PC 117 after having undergone predetermined image processing by the image forming apparatus 100.

On the other hand, if a cancel instruction from the user is accepted in step S906 before the scan job instruction is transmitted from the PC 117 in step S902, the CPU 102 immediately stops the scan operation in step S907. Additionally, in step S908, the CPU 102 notifies the PC 117 of the cancel together with the ID of the job. After that, in step S909, the CPU 102 waits for a cancel accepting notification (job deletion completion notification on the side of the PC 117) from the PC 117. After the processing in step S909, notification reception from the PC 117 may fail due to a communication error, as in step S911. Hence, timeout may be allowed as in step S911.

Figure 4:
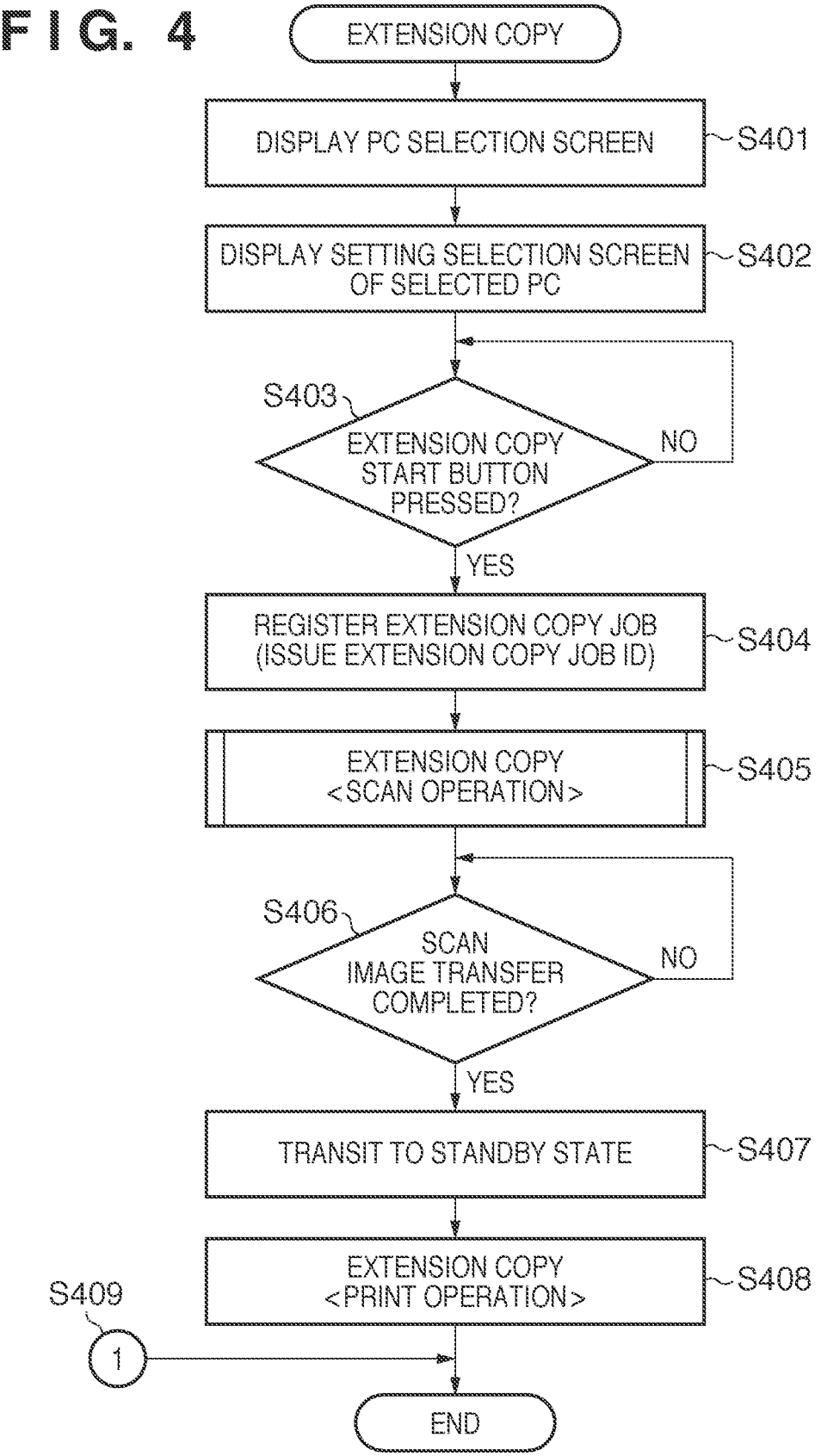
FIG. 4 is a flowchart of the extension copy operation of the image forming apparatus according to the first embodiment.

Upon receiving the cancel accepting notification from the PC 117 in step S909, the CPU 102 registers the canceled job in the job list in correspondence with the ID of the canceled job in step S910, and advances to step S409 in FIG. 4. If no job execution is transmitted from the PC 117 before the elapse of the predetermined time in step S911 (in case of timeout), the process advances to step S912. The CPU 102 displays a message on the UI screen to notify the user that a communication error with the PC 117 has occurred, and advances to step S409 in FIG. 4.

The subroutine of extension copy <print operation> in step S408 will be described next with reference to FIG. 10. First, in step S1001, the CPU 102 transfers a scan image to the PC 117 as a scan job associated with extension copy, and then stands by until reception of a print job from the PC 117. During the standby, the CPU 102 determines in step S1005 whether job cancel is accepted or not and in step S1015 whether a predetermined time has elapsed, as in the above-described <scan operation>.

Upon receiving a print job in step S1001, the CPU 102 assigns a print job ID that matches the number of the job ID received together with the print job, registers it in the job list, and start printing in accordance with the received print data in step S1002. After that, in step S1003, the CPU 102 monitors completion of the print job. When the print job is completed, the process advances to step S1004. the CPU 102 registers the extension copy job, which is determined to be normally completed, in the job history list, and ends the processing.

On the other hand, if cancel occurs in step S1005 before print job reception, the CPU 102 registers the print job ID having the same number as that of the extension copy job ID accepted as cancel as a "cancel target job" in step S1006. The registration destination can be either the job list or a cancel target job list different from the job list. Next, in step S1007, the CPU 102 notifies the PC 117 of the job cancel together with the ID of the canceled extension copy job.

After that, the CPU 102 determines in step S1008 whether a print job including the ID of the cancel target job from the PC 117 is received, and in step S1010 whether a job deletion completion notification is returned. Upon receiving the print job including the ID of the cancel target job from the PC 117 in step S1008, the CPU 102 advances to step S1009 to discard the print job without execution, and then advances to step S1010. Note that although not illustrated, if the print job having the number of the ID is already being executed in step S1010, the CPU 102 cancels the printing at the timing the print job is registered as the cancel target job in step S1006, and ends the processing, as a matter of course.

A case will be described here in which although no cancel target print job is received, the job deletion completion notification is returned from the PC 117 in step S1010. In this embodiment, assuming a case in which the print job from the PC 117 lags behind the job deletion completion notification, the branch to steps S1011 and S1012 is provided. That is, after the job deletion completion notification has been received from the PC 117, the CPU 102 stands by in steps S1011 and S1012 for a predetermined time until the cancel target print job is received. This makes it possible to advance the process to step S1009 to delete even a deletion target print job received after the job deletion completion notification.

If the cancel target job is discarded, or the predetermined time has elapsed, the process advances to step S1013, and the CPU 102 registers the canceled extension copy job in the job history as a canceled job. In step S1014, the CPU 102 deletes registration of the "cancel target job" and advances to step S409 in FIG. 4. If no print job is received from the PC 117 after the elapse of the predetermined time in step S1015, the CPU 102 notifies the user of the occurrence of a communication error in step S1016, and advances to step S409 in FIG. 4, as in the above-described <scan operation>.

As described above, according to this embodiment, in the extension copy function that implements an advanced copy function in cooperation with an external apparatus, a job is reliably and quickly canceled. Especially, even when a job is canceled during the print operation, the unnecessary print job can reliably be canceled by assigning an ID that enables to determine the print job associated with extension copy. In addition, since the job ID is decided in such a way that enables to apply various kinds of conventional job management methods, the system can be implemented without largely changing the existing scan function or print function.

Second Embodiment

Figure 11:
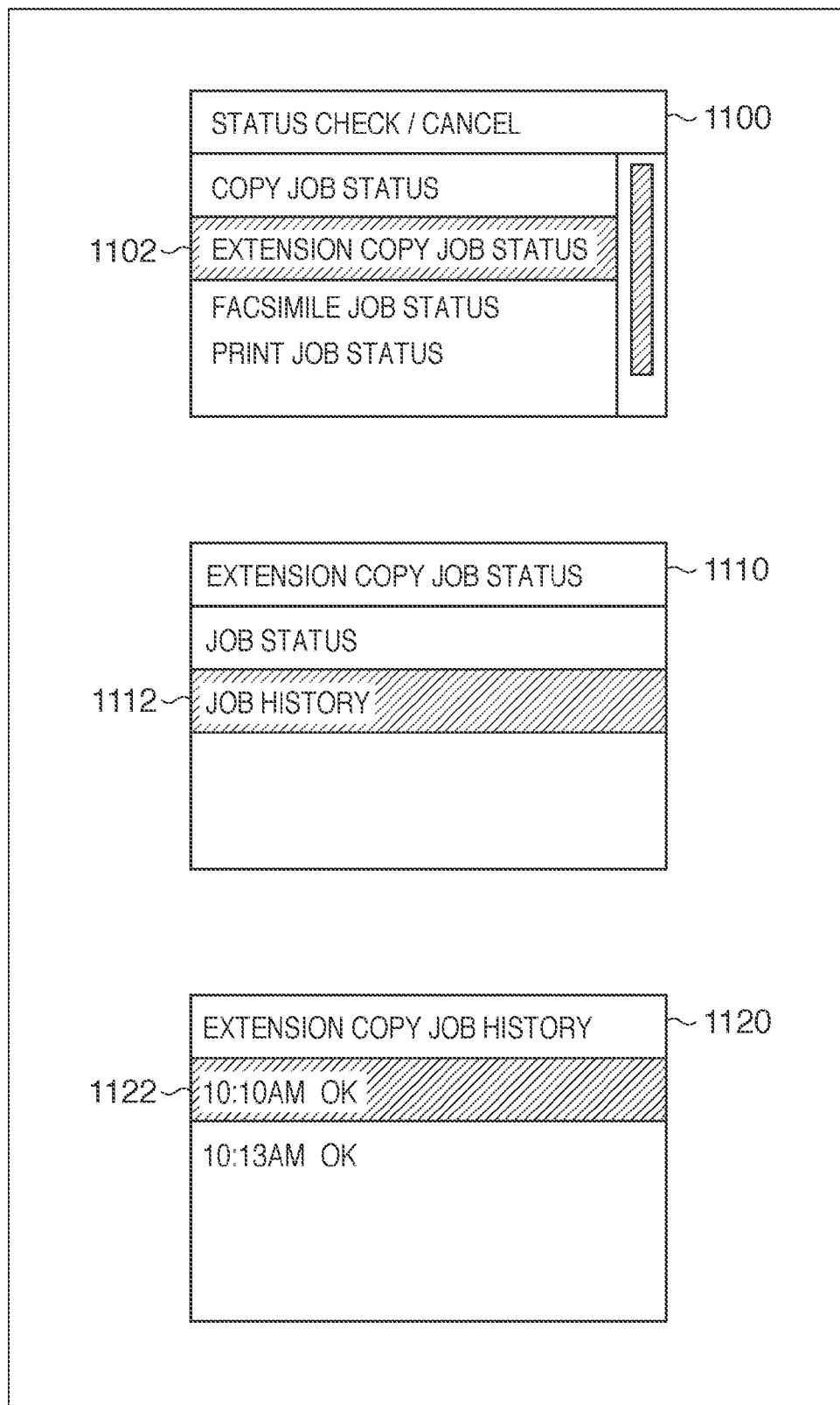
FIG. 11 is a view showing a display unit when referring to an extension copy history according to the second embodiment.
Figure 12:
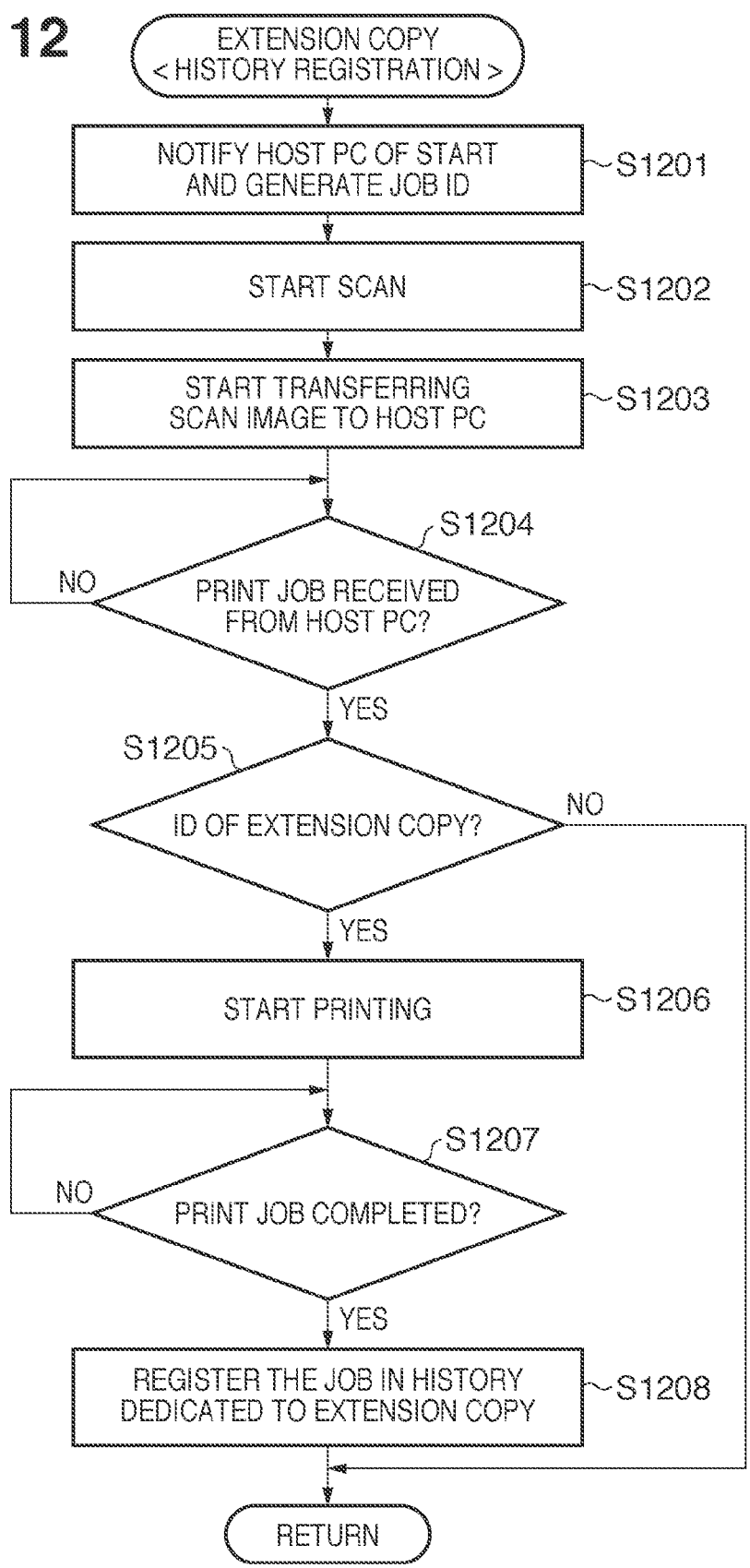
FIG. 12 is a flowchart for explaining the extension copy history registration operation according to the second embodiment.

The second embodiment of the present invention will be described next with reference to FIGS. 11 and 12. In the extension copy function implemented by making an image forming apparatus 100 and a PC 117 cooperate, data that has undergone image processing on the PC side is transferred to the image forming apparatus as a print job. For this reason, the extension copy history may be included in the print history. In this case, for example, when the user wants to refer to the extension copy history, it is difficult to determine whether a history is the print history or the extension copy history. In this embodiment, to solve this problem, the image forming apparatus 100 will be described, which allows to readily refer to a history even in the copy function implemented by the cooperation of the image forming apparatus 100 and the PC 117. Note that a description of the same arrangements and techniques as in the first embodiment will be omitted. That is, arrangements and techniques unique to the second embodiment will mainly be explained below.

The job status check UI screen of the extension copy job and the history reference procedure will be described first with reference to FIG. 11. The user can check the status of the job that is currently being executed by pressing a status check/cancel key 212 of an operation panel 110. An example of the status check/cancel UI screen displayed on a display unit 205 by a CPU 102 upon pressing the status check/cancel key 212 is a UI screen 1100. The items are classified by function into the copy job status, the print job status, and the like. The user selects a function to check by a cursor 1102. A description will be made assuming that the extension copy job status is checked.

When the extension copy job status is selected on the UI screen 1100, the CPU 102 displays a UI screen 1110 on the display unit 205. The user can select, on the UI screen 1110, whether to check the status of a job that is currently being executed or check the job history up to this time. When the user selects the job status on the extension copy job status UI screen 1110 using a cursor 1112, the CPU 102 functions as a display control unit to display, on the display unit 205, a UI screen 1120 that shows the extension copy job history list. For example, the UI screen 1120 indicates that there exist two jobs, that is, a job that has been received at 10:10 AM and a job that has been received at 10:13 AM and printed.

<Control Procedure>

The control procedure of history control according to this embodiment will be described next with reference to FIG. 12. Note that the processing to be described below is implemented by causing the CPU 102 of the image forming apparatus 100 to execute a program read out from a ROM 104 or the like.

First, in step S1201, when the user selects the extension copy function, that is, presses an extension copy key 202 of the operation panel 110, the CPU 102 notifies the PC 117 of the start of extension copy and generates the ID of extension copy. In step S1202, the CPU 102 starts document scan. When the scan has ended, the CPU 102 transfers the scan image to the PC 117 in step S1203.

After that, in step S1204, the CPU 102 stands by until image data that has undergone image processing and an ID representing extension copy are received from the PC 117 as a print job. Upon receiving the print job, the process advances to step S1205. The CPU 102 determines whether the ID included in the print job is that associated with the extension copy ID generated in step S1201. If the ID is that of extension copy, the process advances to step S1206. The CPU 102 starts printing and stands by until the printing is completed in step S1207. In step S1208, the CPU 102 functions as a history recording unit to register the job in the history as extension copy. More specifically, the CPU 102 registers history information in the memory or the like together with a job ID representing that the job is a cooperation job.

As described above, according to this embodiment, it is possible to distinguish a job associated with extension copy by changing part of the conventional copy job ID, scan job ID, and print job ID to a specific "symbol" while holding their formats. This allows to identifiably register the extension copy history.

Other Embodiments

The present invention is not limited to the above-described embodiments, and various changes and modifications can be made. The above embodiments have been described assuming that communication between the image forming apparatus 100 and the PC 117 is done by causing the transmitting side to actively transmit information and commands. However, as another embodiment, the side of the PC 117 may issue a command for checking the status to the image forming apparatus 100 periodically (at a predetermined time interval) and receive an extension copy start notification and the like in status check. In this case, execution preferably starts from the timing the above-described extension copy application 302 or print driver 303 is installed in the PC 117. In the above embodiments, the operations and connection configuration have been described by exemplifying the PC 117 as the external apparatus to cooperate. However, the same functions may be implemented using another information processing apparatus (for example, dedicated server) as the external apparatus in place of the PC 117.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-129353 filed on Jun. 4, 2010, which is hereby incorporated by reference herein in its entirety.

What is claimed is:

1. An image forming apparatus being capable of executing a specific copy job to generate image data by reading an original, to transmit the generated image data to an external apparatus, to receive, from the external apparatus, the image data processed by the external apparatus, and to print the received image data, comprising:

a processor connected to a memory, the processor and memory configured to:
receive a user's instruction;
issue, according to reception of an execution instruction of the specific copy job, a specific copy job identification (ID);
notify the external apparatus of a start of the specific copy job with the specific copy job ID;
read an image on the original in accordance with a scan job for the specific copy job, and generate image data;
transmit the generated image data to the external apparatus;
receive a print job for printing processed image data which the transmitted image data is processed by the external apparatus, with a print job ID issued by the external apparatus based on the notified specified copy job ID;
print an image on a printing material based on the received print job;
receive, before the print job is received, a cancel instruction of the specific copy job;
register, according to reception of the cancel instruction of the specific copy job before the print job is received, the print job ID corresponding to the specific copy job ID as a print job ID to be canceled; and
cancel a print based on the print job when the print job ID of the print job, received after registering the print job ID, coincides with the registered print job ID.

2. The apparatus according to claim 1,
wherein the processor and memory are further configured to start a reading of the original based on the scan job transmitted from the external apparatus in response to the notification.

3. The apparatus according to claim 2, wherein the scan job is transmitted, from the external apparatus, with the print job ID issued by the external apparatus based on the notified specific copy ID.

4. The apparatus according to claim 3, wherein the processor and memory are further configured to
stop a reading process and notify the external apparatus of a cancel instruction with the specific copy job ID to cause the external apparatus to cancel the scan job when the cancel instruction of the specific copy job is received before the reading process is completed.

5. The apparatus according to claim 1, wherein the specific copy job ID includes information indicating the specific copy job and a job number, and the print job ID issued by the external apparatus based on the specific copy job ID includes information indicating the print job and a job number in common with a job number included in the specific copy job ID.

6. The apparatus according to claim 5, wherein the processor and memory are further configured to register, as the print job ID to be canceled, the print job ID including the job number in common with the job number included in the specific copy job ID.

7. The apparatus according to claim 1, wherein the processor and memory are further configured to
notify, when the cancel instruction of the specific copy job is received before the print job is received, the external apparatus of a cancel instruction with the specific copy job ID to cause the external apparatus to cancel the print job.

8. A method of controlling an image forming apparatus being capable of executing a specific copy job to generate image data by reading an original, to transmit the generated image data to an external apparatus, to receive, from the external apparatus, the image data processed by the external apparatus, and to print the received image data, comprising:
receiving, in an operation unit, a user's instruction;
issuing, in an issue unit, according to reception of an execution instruction of the specific copy job through the operation unit, a specific copy job identification (ID);
notifying, in a notification unit, the external apparatus of a start of the specific copy job with the specific copy job ID;
reading, in a reading unit, an image on the original in accordance with a scan job for the specific copy job, and generating image data;
transmitting, in a transmitting unit, the image data generated by the reading unit to the external apparatus;
receiving, in a receiving unit, a print job for printing processed image data which the transmitted image data is processed by the external apparatus, with a print job ID issued by the external apparatus based on the specified copy job ID notified by the notification unit;
printing, in a printing unit, an image on a printing material based on the print job received by the receiving unit;
receiving, in a cancel reception unit configured to receive, before the print job is received by the receiving unit, a cancel instruction of the specific copy job through the operation unit;
registering, in a registration unit, according to reception of the cancel instruction with the specific copy job ID the print job ID corresponding to the specific copy job ID as a print job ID to be canceled; and
canceling, in a print cancel unit, a print based on the print job when the print job ID of the print job, received by the receiving unit after the registration unit registers the print job ID, has coincided with the print job ID registered by the registration unit.

9. A non-transitory computer-readable storage medium storing a computer program that causes a computer to execute a method of controlling an image forming apparatus being capable of executing a specific copy job to generate image data by reading an original, to transmit the generated image data to an external apparatus, to receive, from the external apparatus, the image data processed by the external apparatus, and to print the received image data, the method comprising:
receiving, in an operation unit, a user's instruction;
issuing, in an issue unit, according to reception of an execution instruction of the specific copy job through the operation unit, a specific copy job identification ID;
notifying, in a notification unit, the external apparatus of a start of the specific copy job with the specific copy job ID;
reading, in a reading unit, an image on the original in accordance with a scan job for the specific copy job, and generating image data;
transmitting, in a transmitting unit, the image data generated by the reading unit to the external apparatus;
receiving, in a receiving unit, a print job for printing processed image data which the transmitted image data is processed by the external apparatus, with a print job ID issued by the external apparatus based on the specified copy job ID notified by the notification unit;
printing, in a printing unit, an image on a printing material based on the print job received by the receiving unit;
receiving, in a cancel reception unit configured to receive, before the print job is received by the receiving unit, a cancel instruction of the specific copy job through the operation unit;
registering, in a registration unit, according to reception of the cancel instruction with the specific copy job ID the print job ID corresponding to the specific copy job ID as a print job ID to be canceled; and
canceling, in a print cancel unit, a print based on the print job when the print job ID of the print job, received by the receiving unit after the registration unit registers the print job ID, has coincided with the print job ID registered by the registration unit.

* * * * *